United States Patent Office 3,304,272
Patented Feb. 14, 1967

3,304,272
ION EXCHANGE MATERIALS PREPARED BY ABSORBING STYRENE ONTO PARTICULATE POLYETHYLENE, INTRODUCTION OF ION EXCHANGE GROUPS AND SHAPING
Henryk Zenftman, West Kilbride, Scotland, assignor to Imperial Chemical Industries Limited, London, England, a corporation of Great Britain
No Drawing. Filed Nov. 3, 1958, Ser. No. 771,183
Claims priority, application Great Britain, Nov. 20, 1957, 36,115/57
7 Claims. (Cl. 260—2.1)

This invention relates to new and improved ion exchange materials and to their method of manufacture. The invention is particularly applicable to ion exchange membranes, but it may be applied to ion exchange materials in other forms such as granules.

Ion exchange membranes are generally classified as being either of a homogeneous or of a heterogeneous type. Homogeneous membranes are understood to comprise continuous sheets of ion exchange resin cast on to supporting structural materials such as mesh screens, glass cloth and other materials. Continuous sheets of ion exchange resin without backing have been tried as ion exchange membranes but only in laboratory experiments, since those that have a satisfactory electrical conductivity have proved to be too brittle and of too low a mechanical strength to be of commercial value. Heterogeneous membranes consist of finely powdered ion exchange resins bonded by inert plastic materials. These membranes have a higher mechanical strength and are more flexible than the aforesaid homogeneous type, but their electrical conductivity is substantially reduced because of the incorporation of the ion exchange compound with binding material.

The present invention is designed to provide new and improved ion exchange materials, and particularly ion exchange membranes, which have a greater flexibility and mechanical strength than the aforesaid homogeneous membranes, especially those in unsupported sheet form, and a higher electrical conductivity than the heterogeneous type of membrane as referred to herein. Another object is to enable materials containing ion exchange groups, such as sulphonated polystyrene, which in themselves are water-soluble, to be employed without the necessity of cross-linking to form water-insoluble copolymers and which are of good conductivity.

I have discovered that certain monomers, for example styrene, can be absorbed, we believe by a process of solution, in selected polymers, examples being polyethylene, polypropylene and polyvinyl chloride, which act as carrier, and that the monomers can be converted to ion exchange resins in situ in the carrier polymer. By this means ion exchange materials having the advantages hereinbefore mentioned can be produced. Thus in the preparation of ion exchange materials in accordance with the present invention a selected monomer or mixture of monomers having polymerisable groups, for example ethylenic groups, and capable of forming polymers that have molecules susceptible to the introduction of ionic groups, is absorbed in a synthetic polymer selected to act as an absorbent and carrier. The absorbed monomer or mixture of monomers is polymerised in situ and then reacted to introduce into the molecule of the thus formed polymer a group appropriately chosen to confer ion exchange properties; such groups are well-known to those familiar with the art and include, for example, sulphonic, amino and quaternary ammonium groups. The reactions upon the monomer and the polymer formed therefrom are carried out in known manner; however, due to the presence of the carrier polymer we have found that these reactions take longer to complete than when carried out upon the monomer alone.

In one method of carrying out the invention a film of a carrier polymer is immersed in an active liquid monomer containing a polymerising agent, the film heated to effect polymerisation of the monomer absorbed in the film and the resulting product treated by known means to introduce the group selected to confer ion exchange properties on the polymerised monomer.

In another method of carrying out the invention granules of a carrier polymer, for example, polyethylene, are placed in a mixing device, the required amount of active monomer, for example styrene, is introduced and the components mixed. This step is followed by heating to polymerise the monomer in situ in the carrier polymer granules. The resulting product is treated according to known methods to introduce the group selected to confer ion exchange properties on the polymerised monomer. If it is desired to produce ion exchange membranes the granules so obtained are milled or treated by other known means to produce films.

It will be evident that the carrier polymer must be substantially inert to the treatment to which the absorbed monomer is subjected when polymerising the monomer and converting the thus produced polymer into an ion exchange resin otherwise the strength and flexibility of the finally produced mixed polymer material may become impaired to an extent that would render it unsatisfactory for use in ion exchange membranes. It will be apparent also that the produced ion exchange resin must not leach out from the carrier polymer in aqueous solutions. We are of the opinion that, on polymerisation of the monomer, a solid solution is formed with the carrier polymer and that the absorbed polymer is then molecularly dispersed throughout the carrier polymer.

The amount of, for example, polystyrene produced in the carrier polymer, for example of polyethylene, can be regulated according to the temperature of impregnation with styrene monomer. However, the temperature should not reach the point at which solution of the carrier will occur and we have found that, for example, if the temperature of impregnation is raised above 75° C., when employing the aforementioned constituents, there is a danger that the polyethylene will dissolve in excess styrene. It is to be noted that polystyrene, alone, forms brittle films which disintegrate on sulphonation and it will be evident that, if too high a proportion of the monomer is introduced into the carrier polymer, a point will be reached when the finally produced mixed polymer will lack the mechanical strength required for the production of satisfactory ion exchange membranes.

*Example 1*

In the preparation of an ion exchange membrane of the cationic type in accordance with the invention a polyethylene film of thickness 0.005" was immersed in styrene monomer containing 1% benzoyl peroxide for one minute at 75° C. and was found to absorb styrene in the proportion of 48 parts of styrene to each 100 parts of polyethylene by weight. The film was now heated with exclusion of air for an hour at 125° C. The originally slightly opaque film became clear on heating then regained its opacity to an intensified degree which was found to indicate that the polymerisation reaction had occurred. The film incorporating the polystyrene was now immersed for an hour in chlorsulphonic acid at 50° C., then washed with 92% sulphuric acid, neutralised with 2% sodium hydroxide solution and finally washed with water. The ion exchange material so prepared was found to swell to a moderate extent only in water and the substituted polystyrene containing ion exchange groups did not leach out in aqueous solutions.

A film prepared by the foregoing method was found to have a resistance of 1.65 ohms per sq. cm. as measured with a 1000 c.p.s. conductivity bridge; its selectivity, as determined by measuring the potential set up across the membrane in contact with solutions of 0.1 N and 0.2 N potassium chloride, was found to be 0.96.

The polyethylene employed in this and the following examples was that prepared by the well-known high pressure method.

*Example 2*

In the preparation of cationic ion exchange membrane a polyethylene film of thickness 0.005", was immersed in styrene monomer containing 1% azodiisobutylnitrile for 5 minutes at 60° C., during which time the weight of the film increased by about 30%, and treated as described in Example 1. The film was sulphonated in similar manner to that described in Example 1 above. The membrane obtained was found to have a resistance of 4.6 ohms per sq. cm. and a selectivity of 0.98.

*Example 3*

In the preparation of a cationic exchange membrane 76 parts by weight of polyethylene in the form of granules passing No. 70 B.S.S. mesh were mixed thoroughly with 24 parts styrene containing 1% benzoyl peroxide. The mixture was heated in a closed vessel in a nitrogen atmosphere for 80 hours at 90 to 95° C. The monomeric styrene became absorbed in the polyethylene and subsequently polymerised in situ. The granules were compressed under 6,000 lb./sq. in. at 120° C. into a sheet 0.006" thick. A uniform semi-transparent film was obtained which, after treatment with chlorsulphonic acid for 30 minutes at 52° C., produced a cation exchange membrane having a resistance of 5.8 ohms/sq. in. and a selectivity of 0.97.

Although the foregoing examples refer to the preparation of cationic membranes, anionic membranes may be prepared by adapting to the usual methods of making anionic exchange resins the method generally disclosed of absorbing a selected monomer in a suitable carrier polymer, polymerising the monomer in situ and introducing an ion exchange group into the thus produced polymer.

What I claim is:

1. In a process for the production of ion exchange materials which includes the introduction of ion exchange groups into the aromatic constituent of a film consisting essentially of a carrier selected from polyethylene and polypropylene, and styrene polymerized in situ therein by treating said film with a group which confers ion exchange properties thereon, the steps of successively mixing a predetermined quantity of styrene monomer with and absorbing it into said carrier selected from polyethylene and polypropylene in granular form in the presence of a polymerization catalyst, heating said resulting granules until the styrene monomer absorbed therein has been converted into a polymeric resinous product, and forming a film from the resulting thermoplastic granules at a temperature of from about 90 to 95° C. by the application of heat and pressure.

2. The process according to claim 1 in which the carrier polymer is polypropylene.

3. The process according to claim 1 in which the carrier polymer is polyethylene.

4. A process as claimed in claim 1 wherein polymerization is carried out under a nitrogen atmosphere and in a closed vessel.

5. A process as claimed in claim 1 wherein said polymerization catalyst is benzoyl peroxide.

6. In a process for the production of ion exchange membranes wherein a solid film forming carrier material selected from the group consisting of polyethylene and polypropylene is mixed thoroughly with styrene monomer and said styrene is polymerized in situ and ion exchange groups are introduced into styrene nuclei, the steps of mixing styrene monomer with a film forming carrier material selected from the group consisting of polyethylene and polypropylene in granular form so that said carrier material absorbs the styrene, heating the resulting granules in the presence of a polymerization catalyst to polymerize the styrene and forming a film from the resulting granules.

7. In a process for the production of ion exchange material wherein a solid film forming carrier material selected from the group consisting of polyethylene and polypropylene is mixed thoroughly with styrene monomer and said styrene is polymerized in situ and ion exchange groups are introduced into styrene nuclei, the steps of mixing styrene monomer with a film forming carrier material selected from the group consisting of polyethylene and polypropylene in granular form so that said carrier material absorbs the styrene, heating the resulting granules in the presence of a polymerization catalyst to polymerize the styrene and then converting the resulting granules into said ion exchange material.

References Cited by the Examiner

UNITED STATES PATENTS

| | | | |
|---|---|---|---|
| 2,614,976 | 10/1952 | Patnode | 260—2.2 |
| 2,837,496 | 6/1958 | Vandenberg | 260—2.1 |
| 2,883,349 | 4/1959 | Tsunoda | 260—2.1 |

FOREIGN PATENTS

| | | |
|---|---|---|
| 728,508 | 4/1955 | Great Britain. |
| 785,157 | 10/1957 | Great Britain. |
| 795,624 | 5/1958 | Great Britain. |

OTHER REFERENCES

American Chemical Society, Abstracts of Papers of 130th Meeting, Div. of Polymer Chem., Paper No. 28, page 13 S, recd. August 30, 1956.

Chen et al.: J. Polymer Sci., 23, 903–913 (February 1957).

WILLIAM H. SHORT, *Primary Examiner.*

H. N. BURSTEIN, JOSEPH L. SCHOFER, *Examiners.*

J. C. MARTIN, C. H. WENDEL, *Assistant Examiners.*